Patented Apr. 2, 1946

UNITED STATES PATENT OFFICE 2,397,689

THIOL DERIVATIVES

Albert A. Pavlic, Claymont, and William J. Peppel, Wilmington, Del., assignors, by mesne assignments, to the Government of the United States as represented by the Secretary of War No Drawing. Application December 13, 1944, Serial No. 568,064

8 Claims. (Cl. 260—609)

This invention relates to ethers of aliphatic thiols and more particularly to compounds containing the 2,3-dimercaptopropoxy group.

The object of this invention is to provide a new class of compounds, the 2,3-dimercaptopropyl ethers, which may also be named the oxygen ethers of 2,3-dimercaptopropanol. Another object of this invention is to provide simple and expedient methods for preparing the oxygen ethers of 2,3-dimercaptopropanol. A further object of this invention is the formation of oxygen ethers of 2,3-dimercaptopropanol from 2,3-dihalogenopropyl ethers. Other objects will be apparent from the reading of the following description of the invention.

These objects are accomplished by the invention of 2,3-dimercaptopropyl ethers, i. e., of ethers in which one of the groups attached to the ether oxygen is the radical —$CH_2$—CHSH—$CH_2$SH, and of the following processes for preparing them which are briefly described below.

In accordance with one method of preparing the 2,3-dimercaptopropyl ethers of this invention, a 2,3-dihalogenopropyl ether is reacted with an alkali polysulfide and the polymeric polysulfide thus obtained is depolymerized by hydrogenation in the presence of a sulfactive hydrogenation catalyst. The reaction is represented by the following equations, which illustrate the preparation of 2,3-dimercaptopropyl ethyl ether from 2,3-dibromopropyl ethyl ether:

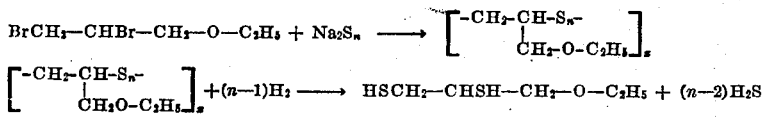

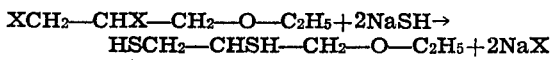

In accordance with another and somewhat more convenient method, a 2,3-dihalogenopropyl ether is reacted directly with an alkali hydrosulfide, thereby replacing the halogen atoms with mercapto groups as represented by the equation:

$XCH_2$—CHX—$CH_2$—O—$C_2H_5$ + 2NaSH →
   $HSCH_2$—CHSH—$CH_2$—O—$C_2H_5$ + 2NaX wherein X is a halogen atom.

The invention will be better understood by reference to the following examples, in which parts are by weight. Examples I to IV, inclusive, illustrate the first method outlined above and Examples V and VI illustrate the second method.

Example I

In a vessel equipped with a stirrer, dropping funnel and thermometer is placed 252 parts of hydrated sodium sulfide ($Na_2S \cdot 9H_2O$), 68 parts of sulfur, and 90 parts of water, the mixture then being warmed to 50° C. and stirred until all the sulfur is in solution. To form magnesium hydroxide, which acts as a dispensing agent during the polymer formation, 12 parts of sodium hydroxide is introduced, followed by dropwise addition with stirring of a solution of 30.6 parts of hydrated magnesium chloride in 40 parts of water. Two hundred forty-six (246) parts of 2,3-dibromopropyl ethyl ether, prepared by bromination of allyl ethyl ether, is added with stirring over a period of 3 to 4 hours while the temperature is maintained at 50±3° C. The resulting mixture, which contains the polymer in suspension, is stirred at 70–75° C. for 7 to 8 hours, cooled, and poured into a large volume of water. The separated polymeric ethylene polysulfide is washed several times with water, filtered, and dried. Two hundred thirty-two (232) parts of this polymer is divided into two parts and each part is placed in an oscillating autoclave with 10 parts of cobalt polysulfide catalyst and 130 parts of dioxane solvent, and subjected to a hydrogen pressure of 2000 pounds per square inch at 125° C. When hydrogen is no longer absorbed, the reaction mixture is cooled, the two runs are combined, the catalyst removed by filtration through a bed of kieselguhr, and nitrogen is blown through the filtrate to remove the hydrogen sulfide. By distillation in vacuo, 70 parts of 2,3-dimercaptopropyl ethyl ether boiling at 75–76° C./6 mm., and having a specific gravity $d_4^{25}$ = 1.0692 and refractive index $N_4^{25}$=1.5049 is obtained. The composition calculated for $C_5H_{12}OS_2$ is C, 39.5%; H, 7.95%; S, 42.1%; thiol sulfur, 42.1% and the composition found indicated C, 40.32%; H, 8.07%; S, 41.95%; thiol sulfur, 42.1%.

Example II

In accordance with the procedure of Example I, a mixture of 252 parts of hydrated sodium sulfide, 60 parts of sulfur, and 90 parts of water, to which 41 parts of hydrated magnesium chloride and 12 parts of sodium hydroxide is added to make magnesium hydroxide in situ, is heated to 50° C. and treated gradually with 232 parts of 2,3-dibromopropyl methyl ether over a period of 5 hours. The resulting mixture is digested with stirring at 70–75° C. for 9 hours, and the polymer isolated by pouring into water, filtering, and washing with a 50/50 water-alcohol mixture. After partial drying in vacuo, 193 parts of the polymer is hydrogenated in two portions in an oscillating autoclave at 125° C. and 2000 pounds per square inch hydrogen pressure, using 125 parts of dioxane as a solvent and 7 parts of cobalt trisulfide as a catalyst. After removing the catalyst and solvent, as in Example I, the product is distilled through a ring packed still, giving the following fractions:

1. At 38-63° C./5.5 mm., 24 parts
2. At 63° C./5.5 mm., 23 parts, $N_D^{25.5}=1.5178$
3. At 65° C./6 mm., 33 parts, $N_D^{25.5}=1.5180$
4. Residue, 32 parts.

Fraction 1 consists of 2,3-dimercaptopropyl methyl ether codistilling with a little water; fractions 2 and 3 are the pure 2,3-dimercaptopropyl methyl ether having a specific gravity $d_4^{25}=1.1102$. The composition calculated for $C_4H_{10}OS_2$ is C, 34.75%; H, 7.25%; S, 46.38%; thiol sulfur, 46.38% and the composition found indicated C, 34.95%; H, 7.50%; S, 44.70%; thiol sulfur, 46.40%.

*Example III*

To a mixture, stirred and heated at 50° C., of 210 parts of hydrated sodium sulfide, 55 parts of sulfur and 60 parts of water is added 21 parts of hydrated magnesium chloride and 8 parts of sodium hydroxide, the latter two ingredients forming magnesium hydroxide, in situ. The mixture is then treated with 200 parts of 2,3-dibromopropyl isoproyl ether, added in the course of 2 hours. After digesting the reaction mixture at 70-75° C. for 7 hours, the polymer is isolated, as in Example I. The moist polymer is hydrogenated in two parts at 125° C. and 2000 pounds per square inch pressure in the presence of 7 parts cobalt trisulfide catalyst and 130 parts dioxane solvent. Preliminary distillation of the combined hydrogenation products gives 67 parts of crude 2,3-dimercaptopropyl isopropyl ether boiling at 51-53° C./1 mm. and containing 34.2% thiol sulfur. Since, in this case, fractional distillation is not altogether satisfactory to obtain the pure material, it is preferable to dissolve the crude product in 40% aqueous sodium hydroxide and extract the neutral impurities with ether, the entire operation being carried out in a nitrogen atmosphere to minimize oxidation of the thiol. The extracted alkaline solution is then cooled to —20° C. and acidified with concentrated hydrochloric acid, the liberated thiol then being extracted with ether, dried and distilled. There is obtained 29 parts of pure 2,3-dimercaptopropyl isopropyl ether, boiling at 75-76° C./5.5 mm. and having a refractive index $N_D^{25}=1.4930$ and a specific gravity $d_4^{25}=1.0249$. The composition calculated for $C_6H_{14}OS_2$ is C, 43.33%; H, 8.49%; S, 38.56%; thiol sulfur, 38.56% and the composition found indicated C, 43.96%; H, 9.06%; S, 38.56%; thiol sulfur, 38.6%.

*Example IV*

A mixture of 264 parts of hydrated sodium sulfide and 71 parts of sulfur is melted at 50° C., no additional water or dispersing agents being added. To the sodium polysulfide is added in 5 hours a solution of 274 parts of 2,3-dibromopropyl n-butyl ether in 200 parts of methanol. After digesting 18 hours at 70-75° C., the solvent is decanted and the clear taffy-like polymer is triturated first with water and then with methanol and after awhile it is partially dried in vacuo. The polymer is then divided into two equal portions, each of which is hydrogenated at 125° C. and 2000 pounds per square inch pressure in the presence of 10 parts of cobalt trisulfide and 100 parts of dioxane. After removing the catalyst and solvent as in Example I, the product of the combined runs is subjected to a preliminary distillation at 1 mm. pressure, giving 91 parts of material boiling at 79-84° C. On refractionation through a two foot column, pure 2,3-dimercaptopropyl n-butyl ether is obtained boiling at 62° C./0.5 mm. and having a refractive index $N_D^{25}=1.4958$ and a specific gravity $d_4^{25}=1.0181$. The composition calculated for $C_7H_{16}OS_2$ is C, 46.6%; H, 8.84%; S, 35.56%; thiol sulfur, 35.56% and the composition found indicated C, 47.2%; H, 9.41%; S, 36.36%; thiol sulfur 35.7%.

*Example V*

A solution of 66 parts of sodium hydroxide in 400 parts of methanol is saturated with hydrogen sulfide at 0° C. The cold solution is added to 125 parts of 2,3-dibromopropyl ethyl ether in a steel autoclave, and the reaction mixture is pressured with hydrogen sulfide at 75 to 100 pounds per square inch. The mixture is heated at 65° C. for 6 hours, cooled and neutralized with concentrated hydrochloric acid, about 60 parts, the methanol and water removed by distillation under reduced pressure, and the remaining sludge of salt and reaction product treated with a little water to dissolve the salt. The resulting crude 2,3-mercaptopropyl ethyl ether (70 parts) is separated, dried over calcium sulfate and fractionally distilled under reduced pressure, 40 parts of pure material boiling at 76-77° C./8 mm. being obtained.

*Example VI*

2,3-Dibromopropyl 2',3'-dihydroxypropyl ether ($HOCH_2-CHOH-CH_2-O-CH_2-CHBr-CH_2Br$)

is prepared by treating, at —30° C., a solution of 126 parts of 2,3-dihydroxypropyl allyl ether in 80 parts of methanol with 145 parts of bromine, added gradually. The solution is divided into two parts and each portion is charged, without purification, into a bomb with 400 parts of a 20% solution of sodium hydrosulfide in methanol. The bomb is closed, pressured with hydrogen sulfide at 100 pounds per square inch, and agitated at room temperature for 48 hours, after which the reaction mixture is discharged, acidified with 60 parts of concentrated hydrochloric acid, and the precipitated salt filtered off. The filtrates from both runs are combined, and the solvent is removed in a stripping still. The thick, viscous residue consisting of inorganic salts, water and crude reaction product is poured into 300 parts of water and the aqueous mixture extracted four times with "Star Solvent" (a commercial solvent comprising acetone, ethyl acetate and alcohol). After removing the solvent at reduced pressure from the combined extracts, the residue is treated with 400 parts of water, then with 350 parts of 40% aqueous hydroxide added slowly at —20° C. under a blanket of nitrogen. After removing the neutral impurities by extraction with "Star Solvent", the thiol is liberated from its alkaline solution by acidifying the latter with hydrochloric acid under a blanket of nitrogen, extracting with "Star Solvent", drying and distilling off the solvent at reduced pressure. The residue is a colorless, viscous liquid which cannot be distilled without decomposition. This product (104 parts) contains 23% of thiol sulfur, which corresponds to a 72% content of 2,3-dimercaptopropyl 2',3'-dihydroxypropyl ether.

The products of this invention have the general formula $HSCH_2-CHSH-CH_2-O-R$

wherein R is an ether-forming radical which is preferably hydrocarbon but may contain substituents such as the nitro, alkyloxy, aryloxy, carbalkoxy groups and the like. It may also bear hydroxyl groups, as in the 2-hydroxyethyl or 2,3-dihydroxypropyl ethers of 2,3-dimercaptopropanol. The radical R may be aliphatic, cycloaliphatic, araliphatic or heterocyclic, saturated or unsaturated. Additional examples of 2,3-dimercaptopropyl ethers include those in which R is n-amyl, cyclohexyl, n-dodecyl, n-octadecyl, oleyl, benzyl, furfuryl, cinnamyl and the like. Those ethers in which R is a saturated aliphatic radical of up to ten carbon atoms constitute the preferred class.

The starting materials for both of the two described processes are ethers of 2,3-dihalogenopropanols. Any such ether in which the halogen atoms are of atomic weight above 20 is suitable, but the dibromo and dichloro ethers are preferred, particularly the former, which are more reactive. Suitable dibromo or dichloro ethers include the methyl, isobutyl, n-hexyl, cyclohexyl, n-decyl and benzyl ethers.

In the process illustrated by Examples I to IV, inclusive the conditions described in connection with the polymerization and hydrogenation steps are not critical, and they may be varied between wide limits, depending upon the choice of the reactants. In the polymerization step, any suitable alkali polysulfide, e. g., potassium polysulfide, may be used instead of sodium polysulfide, and the temperature may be kept within any practical range, such as between 0° and 150° C. This reaction may be carried out under pressure, if desired. Water is a good reaction medium, and organic media such as alcohols (e. g., methanol, ethanol) which are solvents for the alkali sulfide may be used.

The hydrogenation of the polymeric polysulfides containing ether groups is preferably carried out at temperatures in the range of 100° to 150° C. It is possible, however, to operate at temperatures as low as 75° C. and as high as 175° C., but higher temperatures are likely to cause excessive thermal decomposition. In most cases, the reaction proceeds at hydrogen pressures as low as 100 pounds per square inch, but, in order to insure a practical rate of reaction, it is desirable to operate at a hydrogen pressure of at least 500 pounds per square inch. The pressure can be as high as the equipment will stand. Purified hydrogen is not essential. Hydrogen mixed with other gases such as nitrogen or hydrogen sulfide may be used. Usually, an amount of catalyst of from 1 to 15% by weight of the polymer to be converted will produce a satisfactory rate of reaction, although other proportions may be employed as convenient. The use of solvents or liquid suspension media is desirable in the case of those polymers which are solids at the desired reaction temperature. Solvents or diluents which are suitable include water, methanol, ethanol, ether, dioxane, benzene, toluene and the like, dioxane being as a rule preferred.

The sulfactive hydrogenation catalysts used in the preparation of the 2,3-dimercaptopropyl ethers of this invention may be prepared as described in U. S. Patent No. 2,221,804, issued November 19, 1940 to Wilbur A. Lazier and Frank K. Signaigo, U. S. Patent No. 2,230,390, issued February 4, 1941 to Frank K. Signaigo or, in greater detail, in the copending applications of Frank K. Signaigo, Serial Numbers 319,241 and 319,242, filed February 16, 1940. By way of illustration, the cobalt sulfide catalyst referred to in Examples I to IV may be prepared as follows:

Two hundred thirty-seven (237) parts of cobalt chloride hexahydrate is dissolved in 500 parts of water. To this is added rapidly with stirring a solution of 240 parts of sodium sulfide nonahydrate and 64 parts of sulfur in 900 parts of water. A black precipitate forms which is filtered and washed with water to remove soluble salts, then further washed with alcohol to free it from water. The cobalt polysulfide must be protected from oxygen or air because of its pyrophoric nature.

Suitable catalysts in addition to cobalt polysulfide include the sulfides of iron, nickel and molybdenum.

If desired, the catalyst may be recovered by filtration and reused a number of times, since in general it does not become poisoned. If this is done, care should be taken not to expose the catalyst to the air since it is pyrophoric. If the catalyst should be poisoned or destroyed, which may happen if halogen acids are liberated, it may be regenerated by dissolving it in nitric or hydrochloric acid and reprecipitating the metal sulfide by treatment with sodium polysulfide.

The 2,3-dimercaptopropyl ethers are most conveniently isolated from the hydrogenation mixture by filtering off the catalyst, removing the solvent, if any, by distillation, then fractionally distilling the ether at reduced pressure. Alternatively, the solution of the crude hydrogenation product may be poured into a nonsolvent for the 2,3-dimercaptopropyl ether, such as water, followed by separating the product, drying and distilling it. If the 2,3-dimercaptopropyl ether is a solid at room temperature, it may be crystallized from its solution after partial evaporation of the solvent, and recrystallized if desired. If it is neither crystalline or distillable, it may be dissolved in alkali to form the alkali mercaptide; impurities extracted with a water-immiscible solvent and the thiol regenerated by acidification.

The method illustrated in Examples V and VI is somewhat simpler and more convenient, particularly in connection with hydroxyl-substituted ethers like that of Example VI, where it gives more satisfactory results than the other procedure. The preparation of 2,3-dimercaptopropyl ethers by this method may be carried out at any temperature between about 20° C. and about 100° C., but it is slower in the lower range of temperatures, and the yields are less favorable in the higher range. The preferred temperature range is 60–70° C. Other alkali hydrosulfides, e. g., potassium hydrosulfide, may be used. It is highly desirable to carry out the reaction under hydrogen sulfide pressure since the presence of a large excess of hydrogen sulfide tends to increase thiol formation and suppress the formation of by-products. Water may be used as the diluent, but a solvent for both the alkali hydrosulfide and the 2,3-dihalogenopropyl ether is preferable. Alcohols such as methanol, ethanol or propanol are the most suitable of such solvents.

The 2,3-dimercaptopropyl ethers of this invention are of great value as antidotes against toxic agents containing arsenic, particularly against arsines, and in arsenic and cadmium therapy in general. They are also of great interest in chemical synthesis because of the presence of two reactive thiol groups in the molecule.

Having thus described our invention, what we claim as new and wish to secure by Letters Patent is:

1. The compounds of the general formula:

HSCH₂—CHSH—CH₂—O—R where R is a saturated aliphatic ether-forming radical.

2. The compounds of the general formula:

HSCH₂—CHSH—CH₂—O—R where R is a saturated aliphatic ether-forming radical of from 1 to 10 carbon atoms.

3. The ethyl ether of 2,3-dimercaptopropanol.
4. The isopropyl ether of 2,3-dimercaptopropanol.
5. The n-butyl ether of 2,3-dimercaptopropanol.
6. The process for the production of compounds of the general formula:

HSCH₂—CHSH—CH₂—O—R where R is a saturated aliphatic ether-forming radical of from 1 to 10 carbon atoms which comprises reacting a compound of the general formula:

XCH₂—CHX—CH₂—O—R where X is a halogen and R is a saturated aliphatic ether-forming radical of from 1 to 10 carbon atoms and an alkali polysulfide at a temperature less than 150° C. to form a polymeric polysulfide and catalytically hydrogenating said polymer at a temperature within the range of 75° C. to 175° C. and at a pressure in excess of 100 pounds per square inch, in the presence of a sulfactive hydrogenation catalyst.

7. The process for the production of 2,3-dimercaptopropyl ethyl ether which comprises reacting 2,3-dibromopropyl ethyl ether and an alkali polysulfide at a temperature less than 150° C. to form a polymeric polysulfide and catalytically hydrogenating said polymer at a temperature within the range of 100° C. to 150° C. and at a pressure in excess of 100 pounds per square inch in the presence of a cobalt sulfide catalyst.

8. The process for the production of 2,3-dimercaptopropyl ethyl ether as set forth in claim 7 characterized in that the catalytic hydrogenation is conducted at a temperature of about 125° C. and a pressure of about 2000 pounds per square inch in the presence of cobalt trisulfide.

ALBERT A. PAVLIC.
WILLIAM J. PEPPEL.